Figure 1:
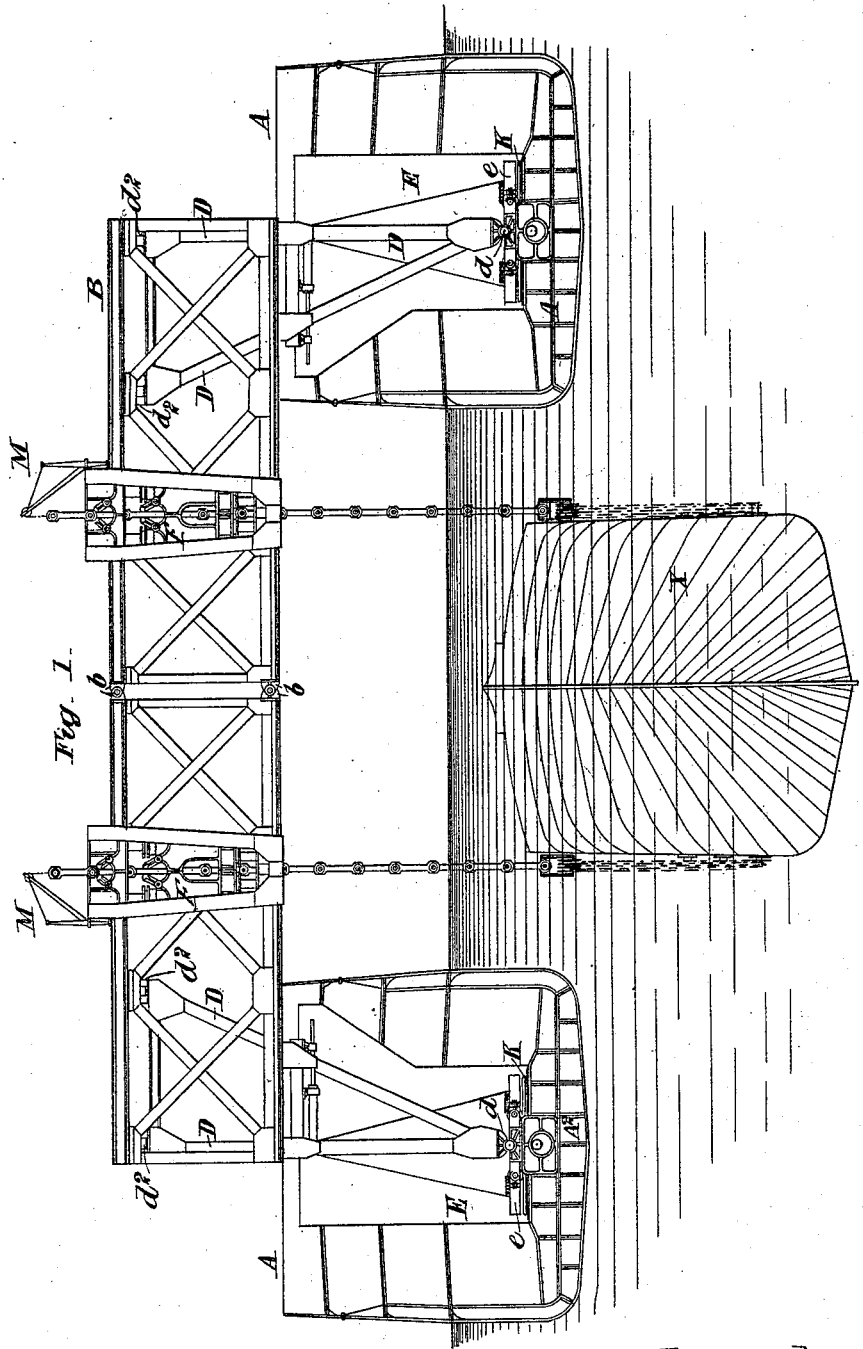

(No Model.) 5 Sheets—Sheet 1.

A. H. TYLER & J. S. E. DE VESIAN.
APPARATUS FOR RAISING SUNKEN VESSELS.

No. 485,398. Patented Nov. 1, 1892.

(No Model.) 5 Sheets—Sheet 3.

A. H. TYLER & J. S. E. DE VESIAN.
APPARATUS FOR RAISING SUNKEN VESSELS.

No. 485,398. Patented Nov. 1, 1892.

Witnesses.
George Baumann
James Gracie

Inventors
Alfred Hugh Tyler and John S. Ellis de Vesian
By their Attorneys
Howson & Howson (No Model.) 5 Sheets—Sheet 4.
A. H. TYLER & J. S. E. DE VESIAN.
APPARATUS FOR RAISING SUNKEN VESSELS.
No. 485,398. Patented Nov. 1, 1892.
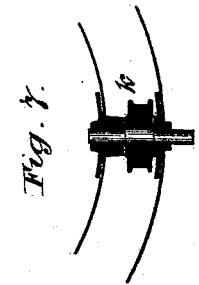
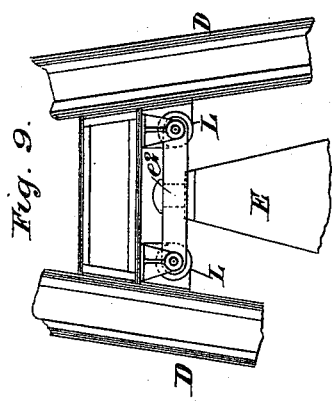
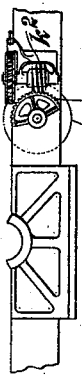
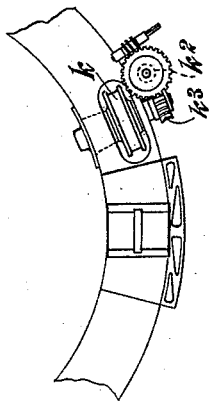
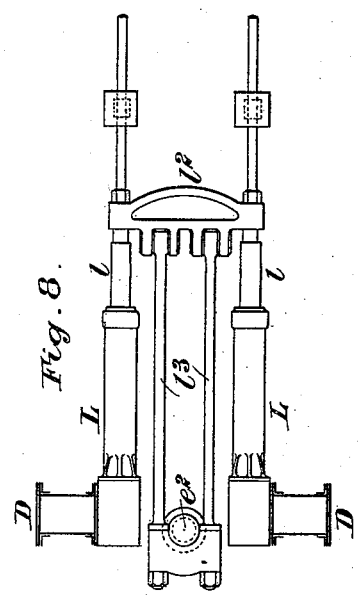
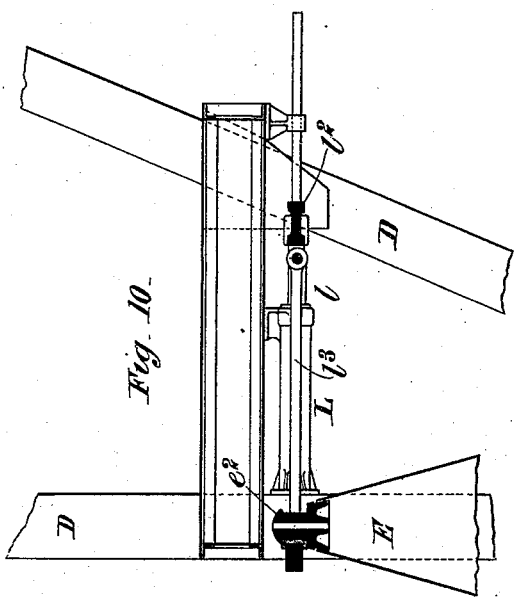
Witnesses.
George Baumann
James Gracie
Inventors.
Alfred Hugh Tyler and John S. Ellis de Vesian
By their Attorneys.
Howson & Howson (No Model.) 5 Sheets—Sheet 5.
A. H. TYLER & J. S. E. DE VESIAN.
APPARATUS FOR RAISING SUNKEN VESSELS.
No. 485,398. Patented Nov. 1, 1892.
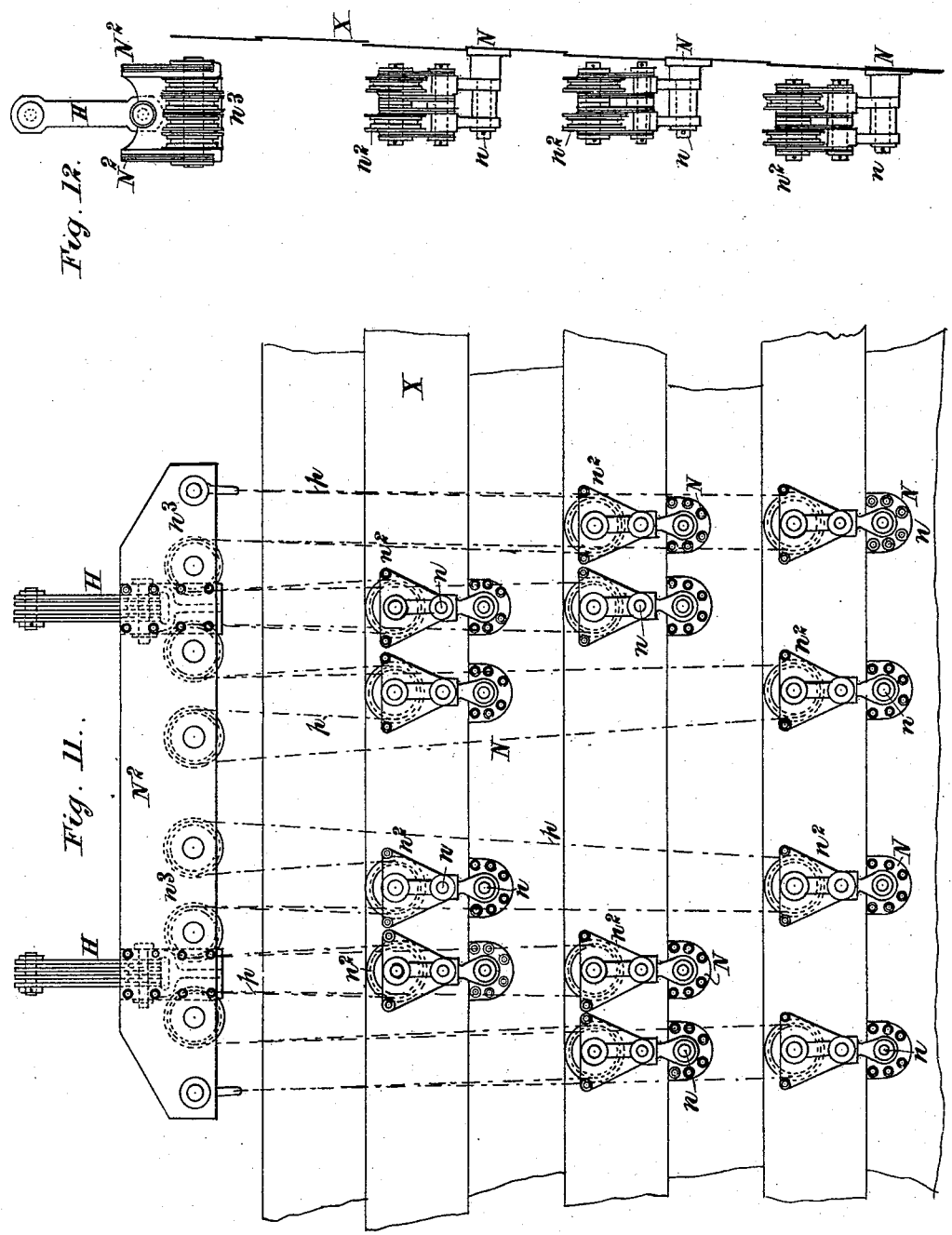

UNITED STATES PATENT OFFICE.

ALFRED H. TYLER AND JOHN S. E. DE VESIAN, OF LONDON, ENGLAND.

APPARATUS FOR RAISING SUNKEN VESSELS.

SPECIFICATION forming part of Letters Patent No. 485,398, dated November 1, 1892.

Application filed January 21, 1892. Serial No. 418,753. (No model.)

*To all whom it may concern:*

Be it known that we, ALFRED HUGH TYLER and JOHN STUART ELLIS DE VESIAN, engineers, both subjects of the Queen of Great Britain and Ireland, residing at 5 Crown Court, Cheapside, in the city of London, England, have invented certain Improvements in Apparatus for Raising Sunken Vessels, Floating Off Stranded Vessels, and for Analogous Purposes, of which the following is a specification.

The object of our invention is to provide an apparatus by which sunken vessels can be raised, stranded vessels be floated off, or analogous operations be performed (for instance, the apparatus can be used for raising vessels or other bodies for repairs or other purposes) in a more efficient and practical manner than with apparatus as hitherto proposed or used.

According to our invention we employ a pair of vessels, between which when the apparatus is in use extends a bridge-like structure or the required number of such structures, (usually three,) each of which structures is divided at or about its center, so that each vessel will carry one of the parts of the said structures to and from the scene of operations. The said parts are provided with efficient means for connecting them together for work and for separating them, and when separated they can be swung inboard, and any parts carried thereby can be stowed or lowered and made fast in their respective vessels. The connection of the parts of the said structures to the vessels is pivotal, such that the structures will be maintained practically steady notwithstanding movement of the vessels on which they are mounted. For this purpose each of the structures at each end is supported on each of the vessels by means of legs or supports, which rest or are mounted upon shafts or center pieces situated in a direction fore and aft of the vessels at or about the center of rolling motion, so that as the vessels roll the rolling movement will not be imparted to the said structures, which will ride upon the said shafts or center pieces which roll with the vessels. To meet the pitching and tossing motion, the structures are each pivotally connected at the upper part of the legs or supports by joints situated at or about right angles to those which are provided for the rolling motion. Fitted so as preferably to run upon the said structures to any required position thereon are hydraulic jacks or lifting-cylinders, by which the chains connected to the vessel to be raised or moved are operated. The said jacks or cylinders have combined with them what we call "compensating cylinders," working over fixed rams and having fluid supplied to the space between; or the ram may be the movable part and the cylinders the stationary. These compensating cylinders, in connection with each jack, may be put into communication with each other in any desired way, so that the fluid has passage from the one to the other of them and will run from cylinder to cylinder and compensate for any vertical movement of the ends of the structure, as when one end rises the fluid will pass to one of the lower cylinders, and consequently the jacks themselves will maintain approximately a true level, so that the load will not be thrown unequally upon the several chains. The connections of the compensating cylinders will be effected so that they can be readily coupled and uncoupled and the passages through them controlled as desired. We do not limit ourselves to any particular way of gripping the chain to enable the jacks to haul them; but the chains are preferably made of links with heads, which present bearing-surfaces for pawls, which are hinged to the lifting-jacks and support the chains and cause them to lift when the fluid under pressure is admitted to the jacks. The compensating cylinders also carry a similar arrangement of pawls to support the chains while the lifting-jacks are descending to take a fresh hold on the chains.

To facilitate the turning of the structures inboard and to their working position, the mounting of the legs or support may be upon turn-tables, and there may be applied hydraulic cylinders to give a tilt to the parts of the structure while they are being brought inboard or into working position. The links of the lifting-chains are made with joints, which can be readily attached, so that they are fastened together link by link as they are lowered and removed link by link as they are raised, the jacks being preferably provided with crane-jibs for the purpose of manipulating the said links. The various connections for controlling the supply and passage of fluid for the lifting and compensating cylinders may be led into a valve-house for the operator, the said valve-house being supported by the structure. The attachment of the chains to the vessel may be effected in any convenient way; but we prefer to effect it by means of a number of plates secured to the ship, to which plates blocks and sheaves are secured. The lower ends of the lifting-chains are also provided with blocks and sheaves, and small chains are passed around these sheaves in such a way as to distribute the pull of each chain over a considerable surface of the sides of the vessel. In place of combining the compensating arrangements with the jacks, as hereinbefore described, they may be combined with ends of the structure, so that the structure itself is supported thereby.

In order that our said invention may be fully understood, we shall now proceed more particularly to describe the same, and for that purpose shall refer to the several figures of the accompanying drawings, the same letters of reference indicating corresponding parts in all the figures.

Figure 2:
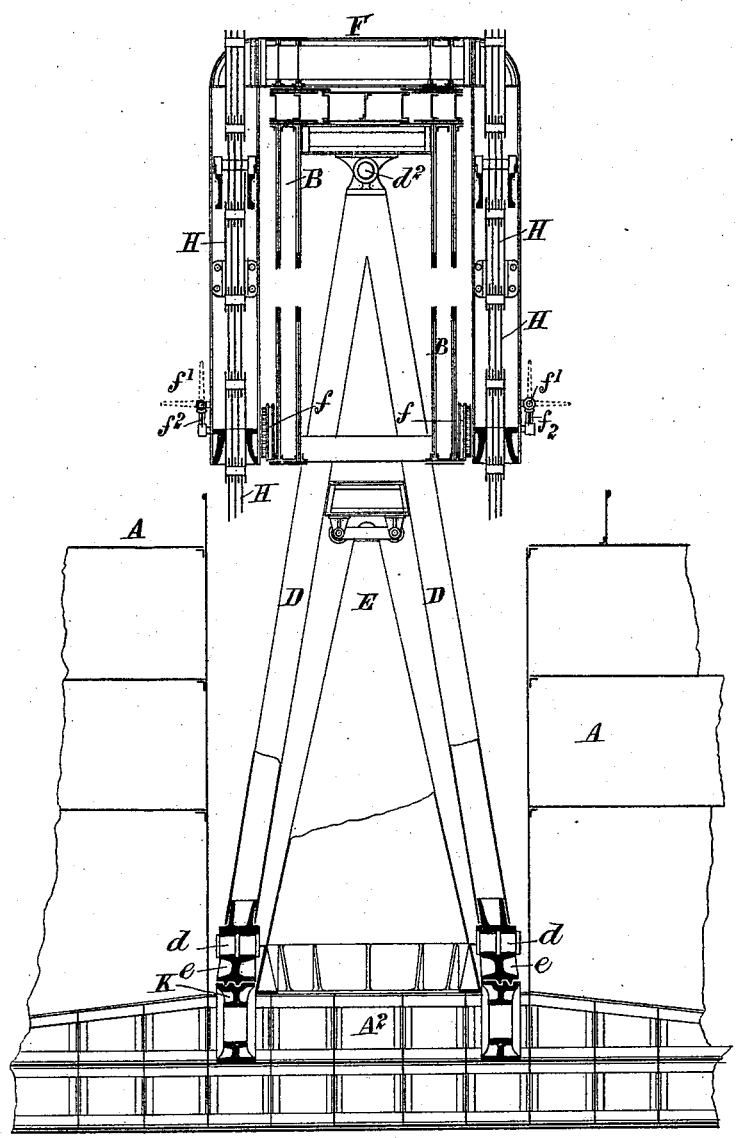
Figure 3:
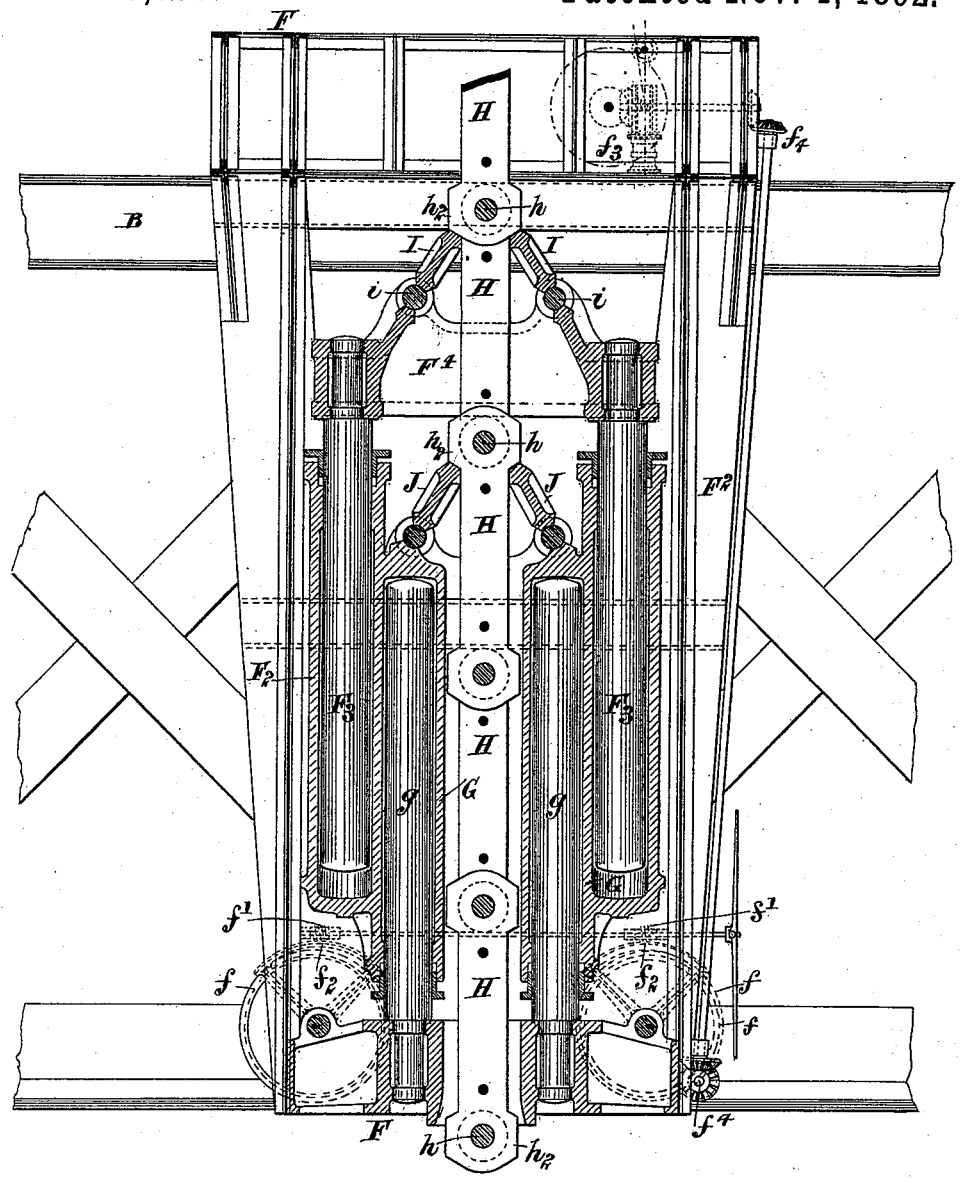
Figure 4:
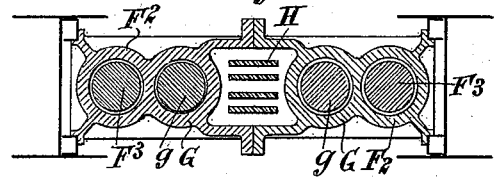

Figure 1 represents in end elevation, and Fig. 2 in partial longitudinal section, through the midship-line of one of the vessels, an apparatus constructed and arranged according to this invention. Fig. 3 is a vertical section, and Fig. 4 a horizontal section, showing one of the jacks. Figs. 5, 6, and 7 show an arrangement for enabling the turn-tables carrying the legs or supports to rest upon wheels or upon a rigid base. Figs. 8, 9, and 10 show the arrangement for giving a tilt to the parts of the girder-like structures, and Figs. 11 and 12 show the plates attached to the vessel and the arrangement of blocks and sheaves and small chains passing thereover.

A are the vessels, each carrying a half of the girder-like structures B, which may be constructed in any suitable way—such, for example, as in the manner in which wrought-iron bridges are built. Each half of the girders B is connected to its vessel A by being mounted upon legs or supports D, the lower ends of which rest, so that they are capable of turning, upon shafts $d$, situated in a direction fore and aft of the vessel at or about the center of rolling motion of the said vessel. The halves of the girders are connected at the upper parts to the legs D by joint pins or trunnions $d^2$, situated with their lengths at or about right angles to the shafts $d$, and the said halves of the girder are connected together by passing pins through lugs $b$ on the half structures. The hydraulic jacks (by which the lifting is effected when the apparatus is at work) are carried on either side of the girders B by saddle-like structures F, which rest upon the upper members of the girders, and are fitted with wheels $f$ to run upon rails on the lower members of the girders. These wheels can be lowered by means of the worms $f'$ and quadrants $f^2$, secured to the cranked axles on which the wheels are mounted, so that then the structures carrying the jacks rest on the wheels and are raised from the upper members of the girders, and they can then be brought to any required position on the girders.

$f^3$ is a motor which by the gearing $f^4$ gives the necessary traversing motion to the said structures carrying the jacks.

$F^2$ are the jack-cylinders, which contain the rams $F^3$, connected by the cross-head $F^4$.

G G are what we have referred to as compensating cylinders. There is one in connection with each jack-cylinder, as shown in Fig. 3, and their interiors are connected together by pipes, through which the fluid in them can flow from one cylinder to the other of the whole series of cylinders or any desired number of them. The said compensating cylinders, provided with the stationary rams $g$, are secured to or formed in one with the jack-cylinders $F^2$, the cylinders G rising and falling over these rams and carrying the cylinders of the jacks with them. The chains by which the lifting is effected are composed of links H, provided with bolts $h$, so that they can be readily put together and separated, each link having heads $h^2$, which present bearing-surfaces for pawls I, hinged at $i$ to the head $F^4$, carried by the rams of the jacks, so that when the rams of the jacks are raised the pawls raise the chains.

J are similar pawls on the compensating cylinders to support the chains while the jack-rams are descending to take under the heads $h^2$ of the next link of the chain in raising.

There is situated between the members of each leg D the structure shown at E, secured to the strengthening-girders $A^2$ at the lower part of the vessel and having around its lower part a circular track K, upon which run the wheels $k$, Figs. 5, 6, and 7, carried by the ring $e$, which supports the shafts $d$, which wheels, by worms $k^2$ and quadrants $k^3$, (connected to eccentric axles on which the said wheels $k$ run,) can be raised or lowered, so that the ring $e$ itself can rest upon the track K when the girders are in position for work, or so that the ring $e$ is supported upon the wheels $k$ when the half-girders are to be moved inward or outward upon the vessels. The track K at its upper part has a circular rail for the wheels $k$ to run on, and if the ring $e$ be formed at its surface with projections and recesses corresponding to this rail these, by engaging with the rail when the ring $e$ is lowered, will support the legs D laterally. L, Figs. 8, 9, and 10, are hydraulic cylinders, which are connected to the legs D and move over the rams $l$, connected by the cross-head $l^2$ and having a link $l^3$, embracing the pivot $e^2$ on the structure E, so as to give a tilt to the parts of the girders while they are being turned outward and inward, this tilting being due to the action of the cylinders between the legs D and the pivot $e^2$, the water being admitted on the side of the rams nearest to D when it is desired to cause the tilting. M are crane-jibs for manipulating the links of the chain. The attachment of the chains to the vessel to be raised is shown more particularly in Figs. 11 and 12, in side and end views, respectively.

N are plates secured to the ship to be raised by bolts passed therethrough and through holes in the hull of the vessel. The said plates carry pins $n$, over which are passed the eyes of the blocks and sheaves $n^2$. The lower ends of the lifting-chains H are connected to beams $N^2$, carrying sheaves $n^3$, and small chains $p$ are passed round these sheaves $n^2$ and $n^3$, as shown, so as to distribute the pull of the chains over a large surface of the vessel. The number of girder-like structures is not necessarily three, as we may use one or any convenient number, as desired; but for general purposes we believe three will be found most convenient.

The following is the way in which the apparatus may conveniently be used. The separate vessel A will proceed to a sheltered spot as near to the scene of operations as possible, with their respective halves of the girder-like structures turned inboard and secured in that position, and then will be brought alongside each other. One jack-supporting structure F on each vessel will then be mounted on its half-girder B. The fastenings which secure the latter in its inboard position will be removed and water will be admitted to the cylinder L to give a tilt to the half-girder, which will be turned outward to project from the vessel's side to meet the corresponding half-girder from the other vessel, which has been similarly operated, and then the half-girders will be lowered by removing the water from the cylinders L until the said half-girders meet, when they are joined together by passing the pins through the lugs on each. The other girders are similarly turned out and connected and then the various hydraulic communications are joined up. The half-girders may be turned in and out by any suitable power and gear, such as by chains worked by the engines of the vessels A. The two vessels A thus connected by the girders B are then brought to either side of the vessel to be raised, (shown at X, Figs. 1, 11, and 12,) and then the chains are connected up and lowered link by link until a sufficient length has been lowered to enable divers to effect the attachment to the sunken vessel by means of the sheaves $n^2$ and $n^3$ and chains $p$. To effect the lifting, sufficient water is admitted to the compensating cylinders G to lift them— say to about half-stroke—and the jacks on the forward girder are started by the pumps, and after the fore part of the sunken vessel has been slightly raised the center and aft pairs of jacks are started and all the jacks then continue to work simultaneously. Each link of the chain H when elevated above the jacks is disconnected and lowered into the vessels A by the jibs M.

Having now particularly described and ascertained the nature of the said invention and in what manner the same is to be performed, we declare that what we claim is—

1. The herein-described apparatus for raising sunken vessels, &c., consisting of the combination of floating vessels with bridge-like structures extending from one such vessel to another and supported thereon with pivotal connections between said structures and vessels to maintain the said structures practically steady notwithstanding the pitching and rolling movements of the vessel, substantially as set forth.

2. The herein-described apparatus for raising sunken vessels, &c., consisting of the combination of floating vessels with bridge-like structures extending from one vessel to another, legs upon which the said bridge-like structures are mounted, with pivotal joints to allow for the pitching movements of the vessels, and pivotal joints between the said legs and the supporting-vessels to allow for the rolling motion of the vessels, all substantially as set forth.

3. The herein-described apparatus for raising sunken vessels, &c., consisting of the combination of floating vessels with bridge-like structures extending from one vessel to another and supported thereon with pivotal connections between said structures, and vessels to maintain said structures practically steady notwithstanding the pitching and rolling movements of the vessels, with saddle-like structures upon the bridge-like structures, and lifting-jacks and compensating cylinders, all substantially as and for the purpose set forth.

4. The herein-described apparatus for raising sunken vessels, &c., consisting of the combination of floating vessels with bridge-like structures in separable parts adapted to be joined between the said vessels, legs mounted upon the latter, with pivotal joints to allow for the rolling motion of the vessels, pivotal joints between the legs and the said bridge-like structures to allow for the pitching movements of the vessels, supports for the said legs, and hydraulic cylinders to tilt the said structures, all substantially as and for the purpose set forth.

5. The herein-described apparatus for raising sunken vessels, &c., consisting of the combination of floating vessels with bridge-like structures extending from one vessel to another, and supports thereon, lifting-chains having links with bearing-surfaces, and hydraulic jacks carried by the bridge-like structures and provided with lifting-pawls to act upon the said bearing-surfaces of the links, all substantially as and for the purposes set forth.

In testimony whereof we have signed our names to this specification in the presence of two subscribing witnesses.

A. H. TYLER.
J. S. E. DE VESIAN.

Witnesses:
J. HAMILTON,
17 *Northumberland Place, Bayswater.*
I. RUSSELL ACTON,
*The Old House, Shepherds Bush, London.*